United States Patent
Song et al.

(10) Patent No.: US 11,723,004 B2
(45) Date of Patent: Aug. 8, 2023

(54) CONFIGURATION METHOD AND APPARATUS FOR BANDWIDTH PART INDICATOR AND COMMUNICATION SYSTEM

(71) Applicant: FUJITSU LIMITED, Kawasaki (JP)

(72) Inventors: Lei Song, Beijing (CN); Lei Zhang, Beijing (CN); Zhe Chen, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 17/079,824

(22) Filed: Oct. 26, 2020

(65) Prior Publication Data

US 2021/0045119 A1 Feb. 11, 2021

Related U.S. Application Data

(63) Continuation of application No. PCT/CN2018/089540, filed on Jun. 1, 2018.

(51) Int. Cl.
*H04W 72/0453* (2023.01)
*H04W 72/1273* (2023.01)
*H04W 72/23* (2023.01)

(52) U.S. Cl.
CPC ... *H04W 72/0453* (2013.01); *H04W 72/1273* (2013.01); *H04W 72/23* (2023.01)

(58) Field of Classification Search
CPC ....... H04L 5/003; H04L 5/0094; H04L 5/001; H04B 7/0691; H04B 7/022; H04W 72/0453; H04W 72/042; H04W 72/1273
See application file for complete search history.

(56) References Cited

U.S. PATENT DOCUMENTS

2011/0267948 A1  11/2011  Koc et al.
2013/0176952 A1  7/2013  Shin et al.
(Continued)

FOREIGN PATENT DOCUMENTS

CN  102238692 A  11/2011
CN  102291731 A  12/2011
(Continued)

OTHER PUBLICATIONS

Extended European search report with supplementary European search report and the European search opinion issued by the European Patent Office for corresponding European Patent Application No. 18920931.5, dated May 20, 2021.
(Continued)

*Primary Examiner* — Chi Ho A Lee
(74) *Attorney, Agent, or Firm* — Myers Wolin, LLC

(57) ABSTRACT

A configuration method and apparatus for a bandwidth part indicator and a system. The method includes: configuring a multi-TRP or multi-panel operation-related mode by a network device for a terminal equipment; and transmitting configuration information and/or downlink control information by the network device to the terminal equipment, for the terminal equipment to determine an active bandwidth part according to received configuration information and/or according to detected multiple pieces of downlink control information. Hence, in the case where the terminal equipment is configured to be in a multi-transmission point or multi-panel operation-related mode, which bandwidth part is taken as an active bandwidth part by the terminal equipment is explicitly or implicitly indicated via configuration information, and the terminal equipment may determine the active bandwidth part according to the received configuration information and/or downlink control information.

12 Claims, 6 Drawing Sheets

---

301 the network device configures a multi-TRP or multi-panel operation-related mode for a terminal equipment

302 the network device transmits configuration information and/or downlink control information to the terminal equipment, for the terminal equipment to determine an active bandwidth part (BWP) according to received configuration information and/or according to detected multiple pieces of downlink control information

(56) References Cited

U.S. PATENT DOCUMENTS

| | | | | |
|---|---|---|---|---|
| 2014/0126520 A1* | 5/2014 | Quan | .................. | H04W 72/042 |
| | | | | 370/329 |
| 2017/0359791 A1 | 12/2017 | Onggosanusi et al. | | |
| 2018/0063865 A1 | 3/2018 | Islam et al. | | |
| 2019/0045533 A1* | 2/2019 | Chatterjee | ............. | H04L 5/0094 |
| 2019/0132793 A1* | 5/2019 | Lin | ................... | H04W 52/0274 |
| 2019/0141742 A1* | 5/2019 | Zhou | ..................... | H04L 5/0057 |
| 2019/0150183 A1* | 5/2019 | Aiba | ...................... | H04L 5/0053 |
| | | | | 370/336 |
| 2019/0182716 A1* | 6/2019 | Futaki | ................... | H04W 80/02 |
| 2019/0199496 A1 | 6/2019 | Qin et al. | | |
| 2019/0232164 A1* | 8/2019 | Griffais | ..................... | G06F 8/41 |
| 2019/0254110 A1* | 8/2019 | He | ................... | H04W 52/0235 |
| 2019/0349964 A1* | 11/2019 | Liou | ................... | H04W 72/046 |
| 2019/0393987 A1* | 12/2019 | Hong | .................... | H04L 1/0072 |
| 2020/0296656 A1* | 9/2020 | Amuru | .................. | H04L 5/0098 |
| 2020/0322116 A1* | 10/2020 | Zhou | ...................... | H04B 7/088 |
| 2021/0058189 A1* | 2/2021 | Xiao | ...................... | H04L 5/0042 |
| 2021/0076445 A1* | 3/2021 | Tsai | ...................... | H04W 76/27 |

FOREIGN PATENT DOCUMENTS

| | | |
|---|---|---|
| CN | 107579809 A | 1/2018 |
| CN | 107872891 A | 4/2018 |
| CN | 108024365 A | 5/2018 |
| EP | 2 595 425 A1 | 5/2013 |
| EP | 3 679 760 | 7/2020 |
| WO | 2019/051177 A1 | 3/2019 |

OTHER PUBLICATIONS

Mediatek Inc., "Remaining Details on Bandwidth Part Operation in NR", Agenda Item: 7.3.4.1., 3GPP TSG-RAN WG1 Meeting 90 bis, R1-1718327, Prague, CZ, Oct. 9-13, 2017.

Catt, "PDCCH search space design", Agenda Item: 6.3.1.2., 3GPP TSG-RAN WG1 Meeting AH_#NR3, R1-1715813, Nagoya, Japan, Sep. 18-21, 2017.

Notice of Reasons for Refusal issued by the Japan Patent Office for corresponding Japanese Patent Application No. 2020-560758, dated Feb. 8, 2022, with an English translation.

International Search Report issued by the State Intellectual Property Office of the P.R. China for corresponding International Patent Application No. PCT/CN2018/089540, dated Sep. 30, 2018, with an English translation.

Written Opinion of the International Searching Authority issued by the State Intellectual Property Office of the P.R. China for corresponding International Patent Application No. PCT/CN2018/089540, dated Sep. 30, 2018, with an English translation.

3GPP TR 36.741 V14.0.0, "3rd Generation Partnership Project; Technical Specification Group Radio Access Network; Study on further enhancements to Coordinated Multi-Point (CoMP) Operation for LTE (Release 14)", Mar. 2017.

Communication pursuant to Article 94(3) EPC issued by the European Patent Office for corresponding European Patent Application No. 18 920 931.5-1215, dated Feb. 23, 2023.

First Notification of Office Action and Search Report issued by the China National Intellectual Property Administration for corresponding Chinese Patent Application No. 201880093014.9, dated Apr. 22, 2023, with an English translation.

* cited by examiner

CONFIGURATION METHOD AND APPARATUS FOR BANDWIDTH PART INDICATOR AND COMMUNICATION SYSTEM

CROSS REFERENCE TO RELATED APPLICATIONS

This application is a continuation application of International Application No PCT/CN2018/089540 filed on Jun. 1, 2018, the contents of which are incorporated herein by reference.

FIELD

This disclosure relates to the field of communication technologies, and in particular to a configuration method and apparatus for a bandwidth part indicator and a communication system.

BACKGROUND

The massive Multiple-Input Multiple-Output (MIMO) technology is a key technology for new radio (NR) systems, including researches on frequency bands below and above 6 GHz. As the frequency band increases, fading and loss generated during transmission will be increased accordingly, and the number of effective transmission paths and transmission distances will be decreased accordingly compared to lower frequency bands. Although the use of beamforming technology may effectively compensate for the fading generated in transmission, it cannot increase effective transmission paths in communication. Therefore, the massive MIMO technology in high frequency bands can only be limited to low-rank transmission. How to increase the data rate becomes a problem.

In the study of the new radio version 15 (NR release15), multiple transmission reception points (TRP) and/or multiple antenna panels are candidate technologies for the massive MIMO technology. By using multiple transmission reception points or multiple antenna panels to serve for the same terminal equipment simultaneously, the number of effective transmission paths in communication is increased, thereby increasing the data rate.

Due to different deployment scenarios, backhaul links (referred to as backhauls in brief) used for information interact among multiple transmission reception points may be divided into two types: ideal type and non-ideal type. When a backhaul is of the ideal type, delays of interact among multiple transmission reception points may be deemed as being less than 2 ms or negligible. When the backhaul is of the non-ideal type, delays of interact among multiple transmission reception points may be much longer than 2 ms, even up to 50 ms. Therefore, on an assumption of non-ideal backhaul, data or signaling interact among multiple transmission reception points should be reduced as much as possible so as to reduce delay of interact and avoid degradation of system performance.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by inventors that a new radio (NR) system needs to support both a backhaul of the ideal type and a backhaul of the non-ideal type. In the 3GPP RAN1 #90 meeting, it was approved that the number of downlink control channels (PDCCHs) used to schedule downlink data channels (PDSCHs) is up to 2, which means that in multi-TRP or multi-panel scenarios, multiple transmission reception points may independently schedule PDSCHs, thereby reducing delays of data or signaling interact in scheduling.

In addition, according to provisions of current standards, a network device may configure up to 4 BWPs for a terminal equipment via configuration signaling (such as RRC signaling), and indicate an active BWP therein via control signaling (such as DCI signaling). However, if multiple transmission reception points do not interact in transmitting downlink control signaling, some of the control signaling conflicts. As shown in FIG. 1, bandwidth part (BWP) indicator fields of two pieces of control signaling indicate the terminal equipment to switch bandwidths to two different BWPs, and according to NR release 15, for the same terminal equipment, the number of BWPs activated at the same time is only 1, hence, the terminal equipment is unable to determine which BWP to be switched to in the next time unit.

In order to solve at least one of the above problems or other similar problems, embodiments of this disclosure provide a configuration method and apparatus for a bandwidth part indicator and a communication system.

According to a first aspect of the embodiments of this disclosure, there is provided a configuration method for a bandwidth part indicator, applicable to a network device, the method including:

configuring a multi-TRP or multi-panel operation-related mode by the network device for a terminal equipment; and transmitting configuration information and/or downlink control information by the network device to the terminal equipment, for the terminal equipment to determine an active bandwidth part according to received configuration information and/or according to detected multiple pieces of downlink control information.

According to a second aspect of the embodiments of this disclosure, there is provided a configuration method for a bandwidth part indicator, applicable to a terminal equipment, the method including:

receiving first configuration information by the terminal equipment, the first configuration information being used for configuring a multi-TRP or multi-panel operation-related mode for the terminal equipment; and when the terminal equipment is configured with the multi-TRP or multi-panel operation-related mode, determining an active bandwidth part by the terminal equipment according to received configuration information and/or according to detected multiple pieces of downlink control information.

According to a third aspect of the embodiments of this disclosure, there is provided a configuration apparatus for a bandwidth part indicator, configured in a network device, the apparatus including:

a configuring unit configured to configure a multi-TRP or multi-panel operation-related mode for a terminal equipment; and a transmitting unit configured to transmit configuration information and/or downlink control information to the terminal equipment, for the terminal equipment to determine an active bandwidth part according to received configuration information and/or according to detected multiple pieces of downlink control information.

According to a fourth aspect of the embodiments of this disclosure, there is provided a configuration apparatus for a bandwidth part indicator, configured in a terminal equipment, the apparatus including:

a receiving unit configured to receive first configuration information, the first configuration information being used for configuring a multi-TRP or multi-panel operation-related mode for the terminal equipment; and a determining unit configured to, when the terminal equipment is configured with the multi-TRP or multi-panel operation-related mode, determine an active bandwidth part according to received configuration information and/or according to detected multiple pieces of downlink control information.

According to a fifth aspect of the embodiments of this disclosure, there is provided a network device, including the apparatus described in the third aspect.

According to a sixth aspect of the embodiments of this disclosure, there is provided a terminal equipment, including the apparatus described in the fourth aspect.

According to a seventh aspect of the embodiments of this disclosure, there is provided a communication system, including the network device described in the fifth aspect and the terminal equipment described in the sixth aspect.

According to another aspect of the embodiments of this disclosure, there is provided a computer readable program, which, when executed in a network device, will cause a computer to carry out the method as described in the first aspect in the network device.

According to a further aspect of the embodiments of this disclosure, there is provided a computer storage medium, including a computer readable program, which will cause a computer to carry out the method as described in the first aspect in a network device.

According to yet another aspect of the embodiments of this disclosure, there is provided a computer readable program, which, when executed in a terminal equipment, will cause a computer to carry out the method as described in the second aspect in the terminal equipment.

According to still another aspect of the embodiments of this disclosure, there is provided a computer storage medium, including a computer readable program, which will cause a computer to carry out the method as described in the second aspect in a terminal equipment.

An advantage of the embodiments of this disclosure exists in that in the case where the terminal equipment is configured to be in a multi-transmission point or multi-panel operation-related mode, which bandwidth part is taken as an active bandwidth part by the terminal equipment is explicitly or implicitly indicated via configuration information and/or downlink control information, such that the terminal equipment may determine the active bandwidth part according to the received configuration information and/or downlink control information, thereby solving the technical problem that the terminal equipment is unable to determine which bandwidth part is switched to in the next time unit due to bandwidth parts indicated by multiple pieces of downlink control signaling being different.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/include/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
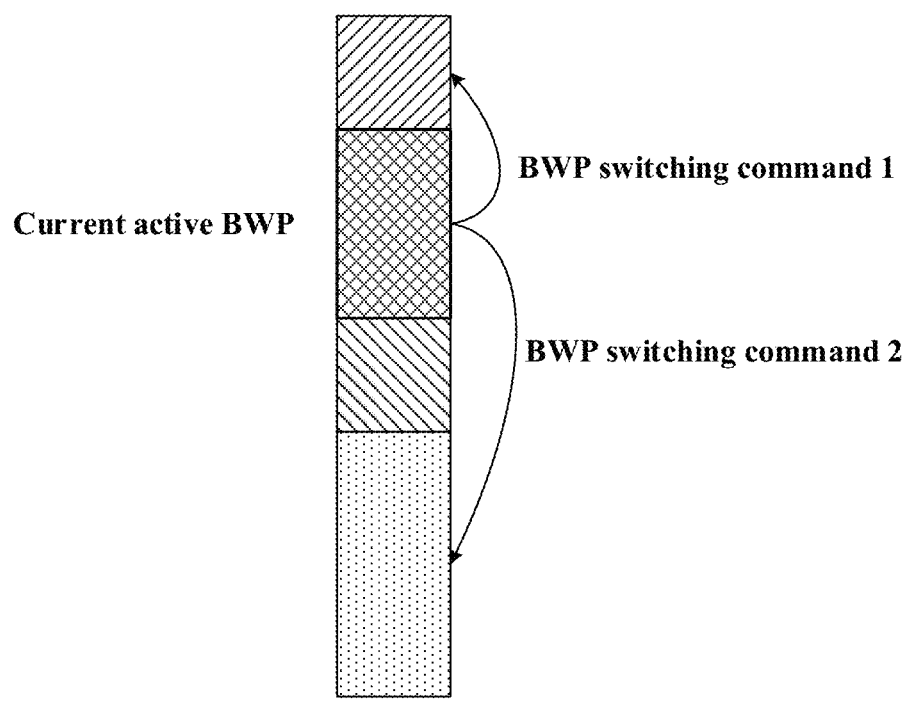
FIG. 1 is a schematic diagram of an existing BWP indicator.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" refers to, for example, equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios of the embodiments of this disclosure shall be described below by way of examples; however, this disclosure is not limited thereto.

Figure 2:
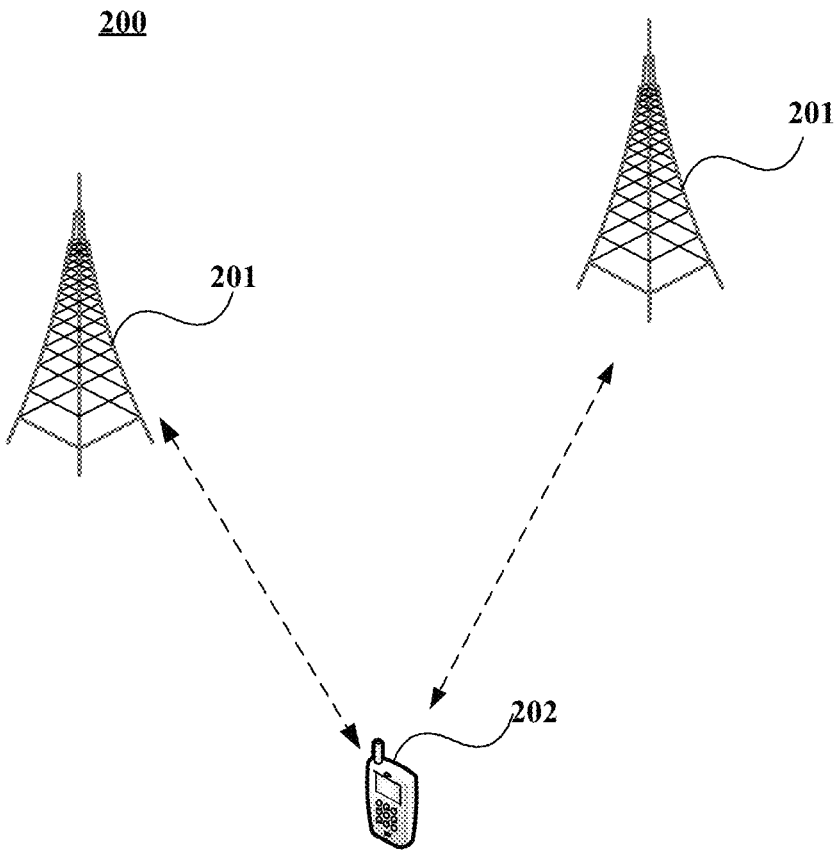
FIG. 2 is a schematic diagram of a communication system of an embodiment of this disclosure.

FIG. 2 is a schematic diagram of a communication system of an embodiment of this disclosure, in which a case where a terminal equipment and a network device are taken as examples is schematically shown. As shown in FIG. 2, a communication system 200 may include network devices 201 and a terminal equipment 202. An example having one terminal equipment 202 and two network devices 201 is schematically given in FIG. 2. The network devices 201 are, for example, network devices gNBs in an NR system.

In the embodiment of this disclosure, existing traffics or traffics that may be implemented in the future may be performed between the network devices 201 and the terminal equipment 202. For example, such traffics may include but not limited to enhanced mobile broadband (eMBB), massive machine type communication (MTC), and ultra-reliable and low-latency communication (URLLC), etc.

The terminal equipment 202 may transmit data to the network devices 201, such as in a grant-free transmission mode. The network devices 201 may receive data transmitted by one or more terminal equipments 202, and feed back information (such as acknowledgement (ACK)/non-acknowledgement (NACK) information) to the terminal equipment 202, and the terminal equipment 202 may acknowledge to end a transmission process according to the feedback information, or may further perform new data transmission, or may perform data retransmission.

Furthermore, in the embodiment of this disclosure, the network devices 201 may provide services for the terminal equipment 202 at the same time, and the network devices 201 may perform various configurations for the terminal equipment via configuration signaling; for example, configuring a multi-TRP or multi-panel operation-related mode for the terminal equipment; and for another example, configuring a number of BWPs for terminal equipment via configuration signaling (such as RRC signaling), and indicating an active BWP therein via control signaling (such as DCI signaling), etc. Moreover, as described above, when multiple network devices 201 do not interact in transmitting DCI signaling, active BWPs indicated by multiple pieces of DCI signaling may be different. In order to solve the problem of confliction of active BWPs indicated by the multiple pieces of DCI signaling, embodiments of this disclosure are proposed.

Various embodiments of this disclosure shall be described below with reference to the accompanying drawings. These embodiments are illustrative only, and are not intended to limit this disclosure.

Embodiment 1

Figure 3:
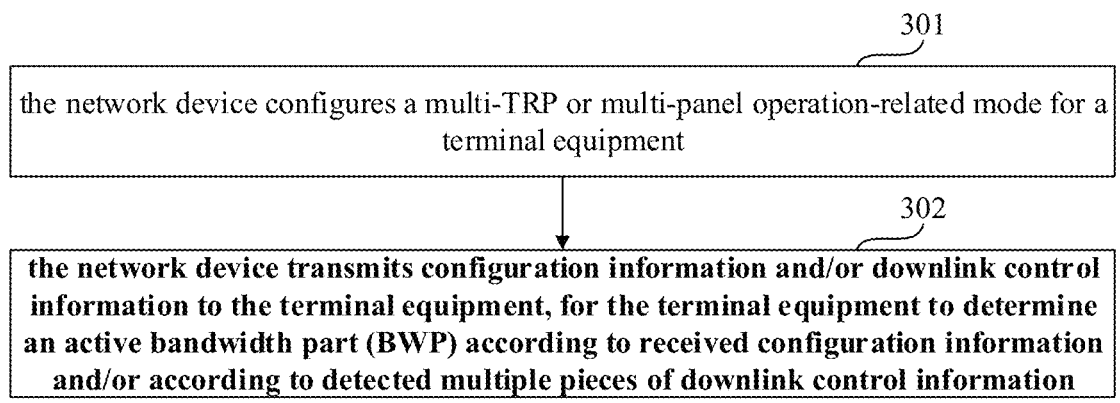
FIG. 3 is a schematic diagram of the configuration method for a bandwidth part indicator of Embodiment 1.

This embodiment provides a configuration method for a bandwidth part indicator, applicable to a network device. FIG. 3 is a schematic diagram of the configuration method for a bandwidth part indicator of this embodiment. Referring to FIG. 3, the method includes:

step 301: the network device configures a multi-TRP or multi-panel operation-related mode for a terminal equipment; and step 302: the network device transmits configuration information and/or downlink control information to the terminal equipment, for the terminal equipment to determine an active bandwidth part according to received configuration information and/or according to detected multiple pieces of downlink control information.

In this embodiment, in the case where the terminal equipment is configured to be in a multi-transmission point or multi-panel operation-related mode, the network device explicitly or implicitly indicates an active BWP via configuration information and/or downlink control information, and the terminal equipment may directly determine the active BWP according to the received configuration information and/or according to detected multiple pieces of downlink control information, thereby solving the technical problem that the terminal equipment is unable to determine an active BWP according to BWPs respectively indicated by the received multiple pieces of downlink control information, that is, the technical problem that which bandwidth part is switched to in the next time unit is solved.

In this embodiment, the network device may configure the multi-TRP or multi-panel operation-related mode for the terminal equipment by transmitting first configuration information to the terminal equipment. The first configuration information here may be explicit or implicit, that is, it may or may not exist.

For example, if the network device explicitly configures the above multi-TRP or multi-panel operation-related mode via higher-layer signaling, the first configuration information is the higher-layer signaling. In such a case, the multi-TRP or multi-panel operation-related mode may be explicitly configured as being one or more transmission schemes, such as a downlink transmission scheme 3, a downlink transmission scheme 4 . . . , an uplink transmission scheme 3, and an uplink transmission scheme 4 . . . , etc.

For another example, the network device may, by configuring some higher-layer parameters, implicitly indicate the terminal equipment to perform multi-TRP or multi-panel related operations. In such a case, the first configuration information does not really exist, but exists implicitly by configuring these higher-layer parameters. For example, whether the terminal equipment performs a multi-TRP or a multi-panel related operation may be implicitly indicated by the number of configured demodulation reference signal port groups (DMRS port groups), and/or the number of phase tracking reference signal (PTRS) ports, etc. When the number of the DMRS port groups or PTRS ports is greater than a value (for example, 1), it is a multi-TRP or a multi-panel related operation; otherwise it is a single-TRP or a single-panel related operation. And whether the terminal equipment performs a multi-TRP or a multi-panel related operation may also be implicitly indicated by the maximum number of configured control information or channels, and when the maximum number of control information or the maximum number of control channels is greater than a value (for example, 1), it is a multi-TRP or multi-panel related operation; otherwise, it is a single-TRP or single-panel related operation. The control information or control channels may be control information or control channels scheduling data channels (PDSCHs, or PUSCHs, etc.). And that the terminal equipment may perform a multi-TRP or a multi-panel related operation may be implicitly indicated by configuring a carrier aggregation (CA) mode or a dual connectivity (DC) mode, etc. In particular, that the terminal equipment may perform a multi-TRP or a multi-panel related operation may be implicitly indicated by configuring a cell group or a secondary cell group or configuring a secondary cell, etc.

Figure 4A:
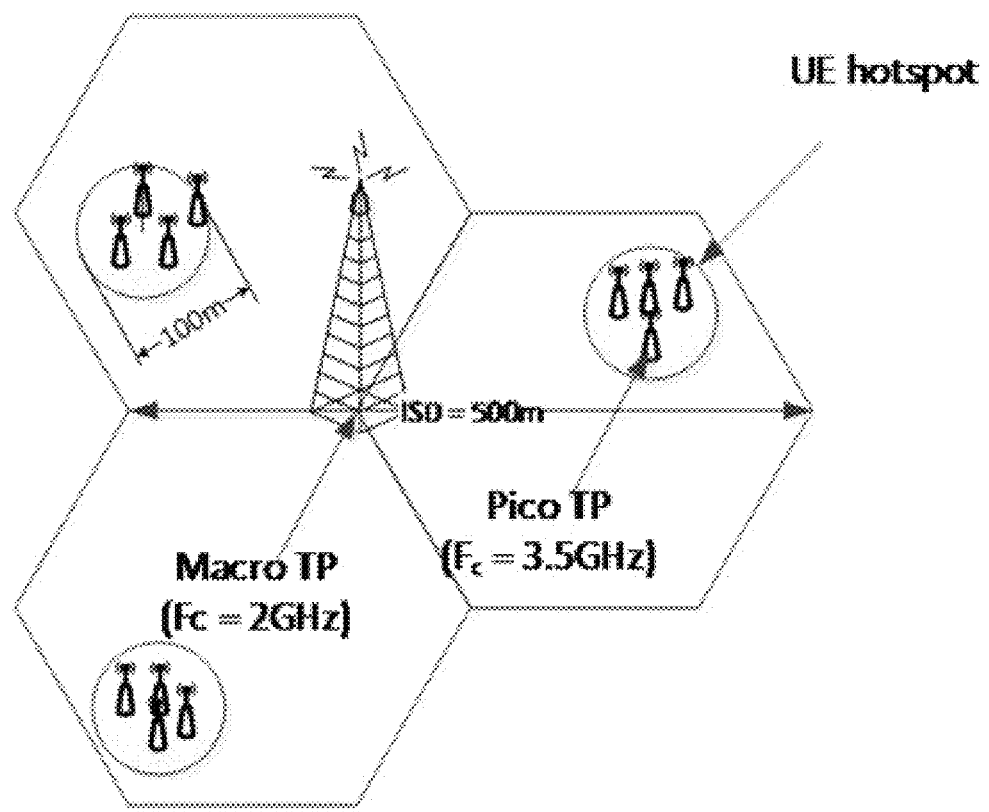
FIG. 4a is a schematic diagram of a scenario D in an LTE FeCoMP subject.
Figure 4B:
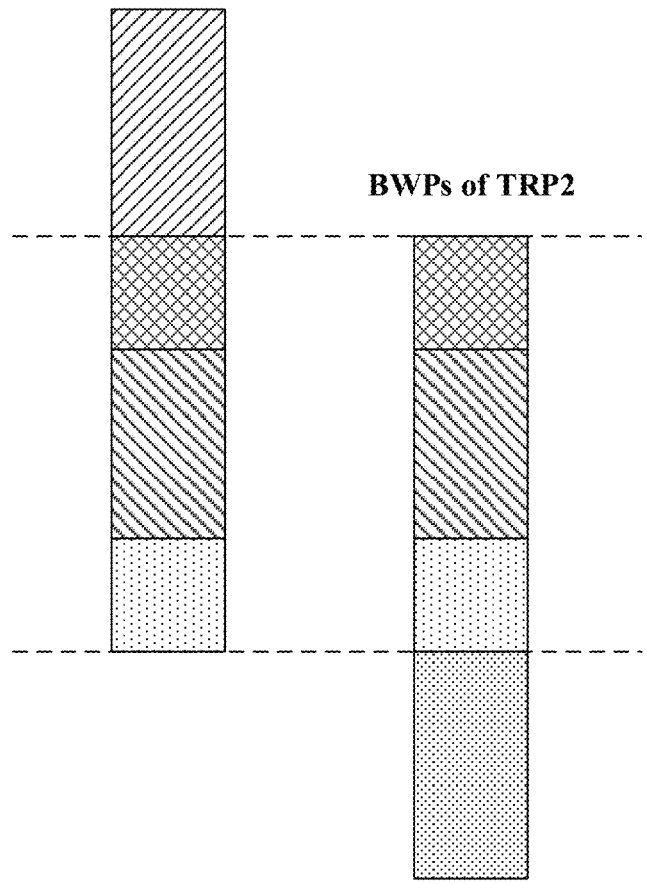
FIG. 4b is a schematic diagram of BWPs configured for a terminal equipment by multiple TRPs serving for the terminal equipment.

In this embodiment, when the terminal equipment is configured to be in a multi-TRP or multi-panel operation-related mode, it is possible that frequency bands and/or BWP divisions of multiple TRPs or multiple panels providing transmission services for the same terminal equipment are different. For example, in a scenario D in the LTE FeCoMP subject, as shown in FIG. 4*a*, a macro transmission point and a pico transmission point use different frequency bands. For another example, as shown in FIG. 4*b*, for a certain terminal equipment, BWPs of a TRP1 providing services for it are different from BWPs of a TRP2 providing services for it. In FIG. 4*b*, a case where the BWPs of the TRPs do not overlap is shown; however, this embodiment is not limited thereto, and the BWPs of the two TRPs providing services for the terminal equipment may or may not overlap, the numbers of the BWPs of the two TRPs may be identical or different, and ranges of the BWPs may be identical or different. Therefore, compared with the single-TRP or single-panel transmission mode, when the terminal equipment is configured to be in the multi-TRP or multi-panel operation-related mode, configurations of the BWPs are also different.

At present, in Rel-15, on a serving cell, a terminal equipment may be configured with at most four downlink BWPs and at most four uplink BWPs. In later versions of NR, such as Rel-16 and later, taking a downlink as an example, a terminal equipment may be configured with at most M downlink BWPs, M being able to be greater than 4. For the multi-TRP or multi-panel operation-related mode, a terminal equipment may be configured with at most N downlink BWPs, N being able to be greater than M. As shown in FIG. 4*b*, TRP1 may configure four BWPs for a terminal equipment within its coverage, and TRP2 may also configure four BWPs for a terminal equipment within its coverage, hence, for a terminal equipment that may be served by both TRP1 and TRP2, at most N BWPs may be configured for it by using higher-layer signaling; where, N may be at most the number of BWPs contained in a union of BWPs of multiple TRPs. That is, a maximum value of the number of BWPs configured in the multi-TRP or multi-panel operation-related mode may be greater than a maximum value of the number of BWPs configured in other modes (such as a single-transmission mode).

Furthermore, in the multi-TRP or multi-panel operation, from the perspective of the terminal equipment, the number of configured BWPs is N. However, on some BWPs, there may be only one TRP that may provide services to the terminal equipment, and may not perform the multi-TRP or multi-panel operation, such as BWPs in TRP1 and TRP2 that do not overlap in FIG. 4*b*. On these BWPs, only single-TRP or single-panel transmission is supported. Therefore, the maximum number of PDCCH transmissions supported at the same time is 1. And for other BWPs, such as BWPs in TRP1 and TRP2 that overlap, the number of PDCCH transmissions supported at the same time may be 2.

Therefore, in above step 301 of this embodiment, the above multi-TRP or multi-panel operation-related mode may be configured separately for each BWP. For example, the BWPs in TRP1 and TRP2 that do not overlap in FIG. 4*b* do not support the multi-TRP or multi-panel operation, and the BWPs in TRP1 and TRP2 that overlap in FIG. 4*b* may support the multi-TRP or multi-panel operation. In such a case, transmission schemes or the number of DMRS port groups or the number of PTRS ports may be respectively configured for each BWP.

In this embodiment, the network device may further configure the maximum allowable number of downlink control channels (PDCCH) or downlink control information (DCI) used for scheduling downlink data channels (PDSCHs) for the terminal equipment, and the maximum number here may also be configured for each BWP respectively. For example, the maximum allowable number of PDCCHs used for scheduling PDSCHs is configured for a BWP. Compared with configuring only one multi-TRP or multi-panel operation-related mode or configuring only one maximum number of PDCCHs in an entire carrier, when the terminal is working on a BWP that is unable to perform multi-TRP or multi-panel operation, the maximum number of the PDCCHs used for scheduling PDSCHs is less than the number of BWPs able to perform multi-TRP or multi-panel operation, and accordingly, the number of times of blind detection may be significantly lowered.

In this embodiment, in one implementation of step 302, the network device may configure the number of BWPs for the terminal equipment by transmitting second configuration information to the terminal equipment, and in order to solve the problem of conflicts of active BWPs indicated by multiple pieces of DCI, the number of BWPs configured by the second configuration information here may not be greater than 1, for example, the number is 1. As the number of BWPs configured by the network device for the terminal equipment is not greater than 1, it is implicitly indicated that the active BWP may only be the BWP configured by the second configuration information, thereby avoiding the problem indicated in the Background. In this implementation, the second configuration information is, for example, higher-layer signaling.

In this embodiment, in another implementation of step 302, the network device may configure BWPs for the terminal equipment by transmitting third configuration information to the terminal equipment. In order to solve the problem of conflicts of active BWPs indicated by multiple pieces of DCI, the maximum number of BWPs activated by each carrier may be greater than 1, or the maximum number of BWPs activated by each carrier is different from the number of BWPs activated by each carrier when the network device configures other modes for the terminal equipment. Here, the number of the active BWPs may be embodied by the number of BWPs activated in each mode pre-defined in a protocol, or it may be the number of BWPs activated in each mode configured via higher-layer signaling, and the numbers of BWPs activated in different modes may be different. Other modes refer to modes other than the above multi-TRP or multi-panel operation-related mode, such as a downlink transmission scheme 1 and other transmission modes concerning a single TRP or a single panel. In addition, the third configuration information may not exist, but is provided in a protocol. And at this moment, the terminal equipment does not actually receive the third configuration information, but the network device and the terminal equipment have the same understanding thereof.

In the single-TRP or single-panel transmission mode, the number of active BWPs for each carrier is 1. In this implementation, when the terminal equipment is configured to be in the multi-TRP or multi-panel operation-related mode, the maximum number of active BWPs for each carrier may be greater than 1. Therefore, BWPs indicated by multiple pieces of DCI may be activjated simultaneously, and as the maximum number of active BWPs for each carrier may be greater than 1, that is, the terminal equipment may be switched to multiple BWPs in a next time unit, the problem pointed out in the Background may be avoided.

In this embodiment, in a further implementation of step 302, the network device may implicitly indicate the active BWP by transmitting downlink control information containing no BWP indicator field or containing a BWP indicator field with a bit width of 0 to the terminal equipment (referred to as first downlink control information, first DCI in brief, for the sake of description). For example, the first DCI does not contain a BWP indicator field, or a bit width of a BWP indicator field contained in the first DCI is 0. As the first DCI does not indicate a BWP, the terminal equipment may determine that a BWP indicated by another piece of DCI is taken as an active BWP, hence, the active BWP is implicitly indicated by the first DCI. Here, it may also say that when the terminal equipment is configured to be in the multi-TRP or multi-panel operation-related mode, it is not expected that detected DCI (DCI format 0_1 or DCI format 1_1) is configured with a BWP indicator field; or it may also say that when the terminal equipment is configured to be in the multi-TRP or multi-panel operation-related mode, it is not expected that a bit width of a BWP indicator field of detected DCI (DCI format 0_1 or DCI format 1_1) is greater than 0 bit; or, when the terminal equipment receives the first DCI, a BWP indicator field in the first DCI may be ignored.

In this embodiment, in yet another implementation of step 302, the network device may implicitly indicate the active BWP by transmitting downlink control information containing a BWP indicator field (referred to as second downlink control information, second DCI in brief, for the sake of description). For example, the number of pieces of the second DCI transmitted in the same scheduling unit is not greater than 1, or, only one of multiple pieces of second DCI signaling transmitted in the same scheduling unit includes a BWP indicator field, and all the other second DCI signaling do not include a BWP indicator field; or, the number of pieces of second DCI transmitted in the same scheduling unit is greater than 1, but BWPs indicated by BWP indicator fields of different second DCI are identical. Therefore, one BWP may be uniquely determined in the same scheduling unit, and the terminal equipment may take it as an active BWP. Here, it may also say that when the terminal equipment is configured to be in the multi-TRP or multi-panel operation-related mode, it is not expected that more than one DCI format 0_1 or DCI format 1_1 configured with a bandwidth part indicator field is detected in the same scheduling unit (such as a slot, or a symbol, etc.); or it may also say that when the terminal equipment is configured to be in the multi-TRP or multi-panel operation-related mode, if more than one DCI format 0_1 or DCI format 1_1 configured with a bandwidth part indicator field is detected in the same scheduling unit (such as a slot, or a symbol), the terminal equipment does not expect that BWPs indicated by bandwidth part indicator fields in multiple DCI formats are different.

In this embodiment, in yet still another implementation of step 302, the network device may implicitly indicate the active BWP by transmitting multi-stage downlink control information (referred to as third downlink control information, third DCI in brief, for the sake of description) to the terminal equipment. For example, one stage of downlink control information (such as a first stage) in the multi-stage downlink control information may at least include a bandwidth part indicator field, and other stages of downlink control information in the multi-stage downlink control information may include scheduling information of each TRP or each panel. Here, it may also say that a bandwidth part indicator field exists in the DCI signaling of the first stage. In this implementation, the bandwidth part indicator field may be a BWP handover command determined by interacting by multiple TRPs, and how to interact and how to determine by the multiple TRPs are not limited in this embodiment.

In this embodiment, in yet further implementation of step 302, the network device may implicitly indicate the active BWP by transmitting downlink control information containing a BWP indicator field (referred to as fourth downlink control information, fourth DCI in brief, for the sake of description). For example, the number of pieces of the fourth DCI transmitted in the same scheduling unit is greater than 1 and BWPs indicated by BWP indicator fields of fourth DCI transmitted in the same scheduling unit are different, and the terminal equipment determines the active BWP according to a BWP indicated by a BWP indicator field contained in one of the fourth DCI. That is, when the terminal equipment is configured to be in the multi-TRP or multi-panel operation-related mode, if more than one DCI format 1_1 or DCI format 0_1 configured with bandwidth part indicator fields are detected in the same scheduling unit (such as a slot, or a symbol) and BWPs indicated by the bandwidth part indicator fields of multiple pieces of DCI are different, the terminal equipment may perform BWP handover according to one piece of DCI signaling therein. For example, BWP handover may be performed according to DCI signaling detected at some pre-defined or configured CORESETs, BWP handover may also be performed according to first detected DCI signaling, and BWP handover may also be performed according to DCI signaling transmitted by a serving cell or a serving TRP or a cell therein. For example, in configuring CORESETs or search spaces, the CORESETs or search spaces of a serving cell or a serving TRP or a cell therein, and the CORESETs or search spaces of other cells, are configured separately, and association of the CORESETs or search spaces with cells is known to the terminal equipment. Or, when the terminal equipment receives the fourth DCI, it may also ignore a BWP indicator field in the fourth DCI.

In this embodiment, similar to the problem of BWP indication, when multiple transmission reception points are performing independent scheduling, no interaction is performed in transmitting downlink control signaling containing a slot format indicator (SFI), which will also cause a problem of conflict of control signaling. For example, for the same terminal equipment, if it receives more than one DCI format 2_0 and makes more than one different SFI indications for the same slot, the terminal equipment is unable to determine which type of slot format is used within the slot.

In this embodiment, in order to solve a problem that an SFI indication is not clear, the network device may configure the terminal equipment based on any one or more of the following understandings, and accordingly, the terminal equipment will have the same understandings:

for some time units, such as slots, or symbols, or multiple symbols in a slot, etc., if they are configured to be in a "flexible" mode by using higher layer signaling, the terminal equipment does not expect to receive more than one DCI format 2_0 to indicate or reconfigure slot structures in these time units;

for some time units, such as slots, or symbols, or multiple symbols in a slot, etc., the terminal equipment does not expect that a received DCI format 2_0 indicates these time units to be of uplink, and at the same time, it is detected that more than one DCI formats in which CRC is scrambled by using a C-RNTI indicate the terminal equipment to receive downlink channels or signals, such as a PDSCH, and a CSI-RS, etc.;

for some time units, such as slots, or symbols, or multiple symbols in a slot, etc., the terminal equipment does not expect that a received DCI format 2_0 indicates these time units to be of downlink, and at the same time, it is detected that more than one DCI formats in which CRC is scrambled by using a C-RNTI indicate the terminal equipment to transmit uplink channels or signals, such as a PUSCH, a PUCCH, a PRACH, or an SRS;

for some time units, such as slots, or symbols, or multiple symbols in a slot, if the terminal equipment receives more than one DCI format 2_0 to indicate or reconfigure slot structures in these time units, it may determine slot format indications of these time units according only to one DCI format 2_0 therein; for example, the slot format indications of these time units may be determined according to DCI format 2_0 detected at some predefined or configured CORESETs, or the slot format indications of these time units may be determined according to first detected DCI format 2_0 signaling, or the slot format indications of these time units may be determined according to DCI signaling transmitted by a serving cell, or a serving TRP, or a cell therein; for example, in configuring CORESETs or search spaces, the CORESETs or search spaces of a serving cell or a serving TRP or a cell therein, and the CORESETs or search spaces of other cells, are configured separately, and association of the CORESETs or search spaces with cells is known to the terminal equipment;

for some time units, such as slots, or symbols, or multiple symbols in a slot, etc., if the terminal equipment receives more than one DCI format 2_0, it may ignore the received DCI format 2_0 signaling, rather, it determines the slot format indicators of these time units based on slot format indicators configured by higher-layer signaling.

Furthermore, the network device may perform slot format indication by using multi-stage DCI. For example, the slot format indicator is placed in DCI signaling of a stage therein, the DCI signaling being a result of negotiation by multiple TRPs, and reference may be made to the process of indicating BWPs by using multi-stage DCI for a particular process of implementation.

The above-mentioned higher-layer signaling may be a higher-layer parameter, UL-DL-configuration-common, or UL-DL-configuration-common-Set2, or UL-DL-configuration-dedicated, etc.

In this embodiment, each BWP may correspond to one or more numerology configurations. For a BWP of a terminal equipment, different TRPs or cells may have different numerology configurations. The numerology configurations here refer to a subcarrier spacing (subcarrierSpacing) and a cyclic prefix configuration (cyclicPrefix); however, they are not limited thereto. Therefore, on one BWP, the terminal equipment may be configured with more than one type of numerology. For example, each TRP or cell provides services for the terminal equipment by using one type of numerology, in which case the BWP configuration is different from current BWP configuration of Rel-15.

In one implementation, numerology configuration to which each BWP corresponds may be terminal equipment-specific configuration, rather than cell-specific configuration. In other words, the numerology configuration of the BWP is UE-specific configuration, rather than cell-specific configuration. Therefore, in this implementation, subcarrierSpacing and cyclicPrefix are no longer configured under BWP-DownlinkCommon or BWP-UplinkCommon, but are configured under BWP-DownlinkDedicated or BWP-UplinkDedicated.

In another implementation, numerology configuration to which each BWP corresponds may be terminal equipment-specific configuration, and may also be cell-specific configuration. That is, the numerology configuration of the BWP may be either UE-specific configuration or cell-specific configuration. For example, common configuration (BWP-DownlinkCommon or BWP-UplinkCommon) contains subcarrierSpacing and cyclicPrefix configurations, which are used to indicate numerology configuration of the serving cell or serving TRP for the terminal equipment. In addition, the UE-specific configuration (BWP-DownlinkDedicated or BWP-UplinkDedicated) also contains subcarrierSpacing and cyclicPrefix configurations, which are used to indicate numerical configuration of other cells or coordinated TRPs for the terminal equipment.

In this embodiment, each type of numerology configuration may include a control resource set (CORESET) and/or a search space configuration in the current numerology. In the configuration of the BWP, one BWP ID may correspond to multiple numerology configurations. Therefore, each piece of configured numerology may include the CORESET and/or search space configuration in the current numerology.

In this embodiment, in the CORESET and/or search space configuration of each BWP, each CORESET and/or search space configuration may correspond to respective numerology configuration.

In this embodiment, each numerology configuration may also correspond to a PDSCH-related parameter. That is, PDSCH-related parameters may also be configured separately in each numerology, such as a resource block group (RBG) size, a modulation and coding strategy (MCS) table, and a maximum codeword number, etc.

Following is an illustration of the BWP configuration according to the method of this embodiment, which corresponds to the BWP configuration in sub-section 6.3.2 of TS38.331.

```
BWP ::=                         SEQUENCE {
locationAndBandwidth            INTEGER (0..37949),
subcarrierSpacing               SubcarrierSpacing,
cyclicPrefix                    ENUMERATED { extended }
        OPTIONAL    -- Need R
}
BWP-Uplink ::=                  SEQUENCE {
bwp-Id                          BWP-Id,
bwp-Common                      BWP-UplinkCommon
        OPTIONAL,   -- Need M
bwp-Dedicated                   BWP-UplinkDedicated
        OPTIONAL,   -- Need M
...
}
BWP-UplinkCommon ::=            SEQUENCE {
genericParameters               BWP,
rach-ConfigCommon               SetupRelease { RACH-ConfigCommon }
        OPTIONAL,   -- Need M
pusch-ConfigCommon              SetupRelease { PUSCH-ConfigCommon }
        OPTIONAL,   -- Need M
pucch-ConfigCommon              SetupRelease { PUCCH-ConfigCommon }
        OPTIONAL,   -- Need M
...
}
BWP-UplinkDedicated ::=         SEQUENCE {
pucch-Config                    SetupRelease { PUCCH-Config }
        OPTIONAL,   -- Need M
pusch-Config                    SetupRelease { PUSCH-Config }
        OPTIONAL,   -- Need M
configuredGrantConfig           SetupRelease { ConfiguredGrantConfig }
        OPTIONAL,   -- Need M
srs-Config                      SetupRelease { SRS-Config }
        OPTIONAL,   -- Need M
beamFailureRecoveryConfig       SetupRelease { BeamFailureRecoveryConfig }
        OPTIONAL,   -- Need M
...
}
BWP-Downlink ::=                SEQUENCE {
bwp-Id                          BWP-Id,
bwp-Common                      BWP-DownlinkCommon
        OPTIONAL,   -- Need M
bwp-Dedicated                   BWP-DownlinkDedicated
        OPTIONAL,   -- Need M
...
}
BWP-DownlinkCommon ::=          SEQUENCE {
genericParameters               BWP,
pdcch-ConfigCommon              SetupRelease { PDCCH-ConfigCommon }
        OPTIONAL,   -- Need M
pdsch-ConfigCommon              SetupRelease { PDSCH-ConfigCommon }
        OPTIONAL,   -- Need M
...
}
```

```
BWP-DownlinkDedicated ::=      SEQUENCE {
pdcch-Config                   SetupRelease { PDCCH-Config }
    OPTIONAL,  -- Need M
pdsch-Config                   SetupRelease { PDSCH-Config }
    OPTIONAL,  -- Need M
sps-Config                     SetupRelease { SPS-Config }
    OPTIONAL,  -- Need M
radioLinkMonitoringConfig      SetupRelease { RadioLinkMonitoringConfig }
    OPTIONAL,  -- Need M
...
}
```

Taking downlink as an example, it can be seen that BWP-Downlink includes bwp-ID, bwp-Common, and bwp-Dedicated, indicating that each BWP includes common and dedicated configurations. The bwp-Common includes genericParameters, which are actually BWPs, and the configuration of the BWP includes subcarrierSpacing and cyclicPrefix, which are configurations of numerology. In addition, the CORESET and searchspace configuration exist in pdcch-ConfigCommon and pdcch-Config, but not in genericParameters. And the PDSCH-related parameters exist in pdsch-ConfigCommon and pdsch-Config.

With the method of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

Embodiment 2

Figure 5:
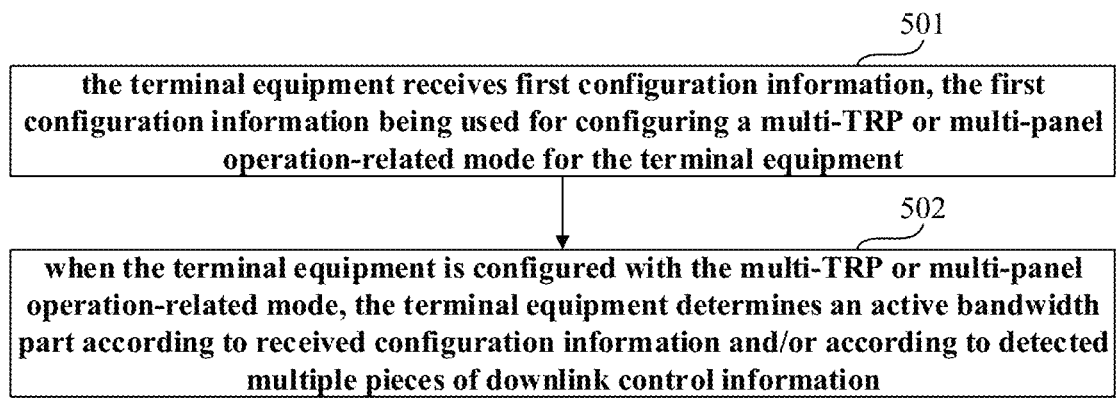
FIG. 5 is a schematic diagram of the configuration method for a bandwidth part indicator of Embodiment 2.

This embodiment provides a configuration method for a bandwidth part indicator, applicable to a terminal equipment, and is processing at a terminal equipment side corresponding to the method of Embodiment 1, with contents identical to those in Embodiment 1 being not going to be described herein any further. FIG. 5 is a schematic diagram of the configuration method for a bandwidth part indicator of this embodiment. Referring to FIG. 5, the method includes:

step 501: the terminal equipment receives first configuration information, the first configuration information being used for configuring a multi-TRP or multi-panel operation-related mode for the terminal equipment; and step 502: when the terminal equipment is configured with the multi-TRP or multi-panel operation-related mode, the terminal equipment determines an active bandwidth part according to received configuration information and/or according to detected multiple pieces of downlink control information.

In this embodiment, as described in Embodiment 1, the network device may configure the terminal equipment with the multi-TRP or multi-panel operation-related mode via the first configuration information. The first configuration information may be explicit or implicit, and the terminal equipment may receive the first configuration information.

In this embodiment, as described in Embodiment 1, the network device may configure the number of BWPs for the terminal equipment via second configuration information. Here, the number of BWPs may be not greater than 1, such as 1. The terminal equipment may receive the second configuration information, and not expect that the number of the configured BWPs is greater than 1. Thus, the active BWP is implicitly indicated via the second configuration information.

In this embodiment, as described in Embodiment 1, the network device may configure BWPs for the terminal equipment via third configuration information. Here, the maximum number of active BWPs for each carrier may be greater than 1, or the maximum number of active BWPs for each carrier may be different from the number of active BWPs for each carrier when the terminal equipment is configured to be in other modes (such as a single-transmission mode), and the terminal equipment may receive the third configuration information. In addition, the third configuration information may possibly not exist, but may be provided in a protocol. Thus, the active BWP is implicitly indicated via the third configuration information.

In this embodiment, as described in Embodiment 1, the network device may implicitly indicate the active BWP via the first DCI that contains no BWP indicator field or contains a BWP indicator field with a bit width of 0. The terminal equipment may receive the first DCI, and the terminal equipment does not expect that the detected first DCI is configured with a BWP indicator field, or the terminal equipment does not expect that a bit width of a BWP indicator field contained in the detected first DCI is greater than 0 bit, or, the terminal equipment ignores a BWP indicator field in the first DCI. Thus, the active BWP is implicitly indicated via the first DCI.

In this embodiment, as described in Embodiment 1, the network device may implicitly indicate the active BWP via the second DCI including a BWP indicator field. The terminal equipment may receive the second DCI, and the number of pieces of the second DCI detected in the same scheduling unit is not greater than 1; or, the terminal equipment does not expect to detect more than one pieces of second DCI in the same scheduling unit; or, in a case where the number of pieces of second DCI detected in the same scheduling unit is greater than 1, only one of the multiple pieces of second DCI signaling detected in the same scheduling unit contains a BWP indicator field, and the other second DCI does not contain BWP indicator field; or, in a case where the number of pieces of the second DCI detected in the same scheduling unit is greater than 1, the terminal equipment expects that BWPs indicated by BWP indicator fields in the multiple pieces of second DCI detected in the same scheduling unit are identical; or, in a case where the number of pieces of the second DCI detected in the same scheduling unit is greater than 1, the terminal equipment does not expect that BWPs indicated by BWP indicator fields in the multiple pieces of second DCI detected in the same scheduling unit are different. Thus, the active BWP is implicitly indicated via the second DCI.

In this embodiment, as described in Embodiment 1, the network device may implicitly indicate the active BWP via multi-stage DCI (third DCI). The terminal equipment may receive the multi-stage DCI (third DCI), and DCI of one stage in the multi-stage DCI at least includes a BWP indicator field, and DCI of other stages in the multi-stage DCI includes scheduling information of each TRP or each panel. Thus, the active BWP is implicitly indicated via the third DCI.

In this embodiment, as described in Embodiment 1, the network device may implicitly indicate the active BWP via fourth DCI containing a BWP indicator field. The terminal equipment may receive the fourth DCI, the number of pieces of fourth DCI detected in the same scheduling unit is greater than 1, BWPs indicated by BWP indicator fields contained in multiple pieces of fourth DCI detected in the same scheduling unit are different, and the terminal equipment may determine the active BWP according to a BWP indicated by a BWP indicator field contained in one piece of the fourth DCI. In addition, when the terminal equipment receives the fourth DCI, it may also ignore the BWP indicator fields in the fourth DCI.

As the behaviors of the terminal equipment have been described in Embodiment 1, they shall not be described herein any further.

Furthermore, in this embodiment, as described in Embodiment 1, in order to solve a problem that an SFI indication is not clear, the network device may configure the terminal equipment based on any one or more of the following understandings, and accordingly, the terminal equipment may determine the SFI based on the same understandings:

for some time units, such as slots, or symbols, or multiple symbols in a slot, etc., if they are configured to be in a "flexible" mode by using higher layer signaling, the terminal equipment does not expect to receive more than one DCI format 2_0 to indicate or reconfigure slot structures in these time units;

for some time units, such as slots, or symbols, or multiple symbols in a slot, etc., the terminal equipment does not expect that a received DCI format 2_0 indicates these time units to be of uplink, and at the same time, it is detected that more than one DCI formats in which CRC is scrambled by using a C-RNTI indicate the terminal equipment to receive downlink channels or signals, such as a PDSCH, and a CSI-RS, etc., in these time units;

for some time units, such as slots, or symbols, or multiple symbols in a slot, etc., the terminal equipment does not expect that a received DCI format 2_0 indicates these time units to be of downlink, and at the same time, it is detected that more than one DCI formats in which CRC is scrambled by using a C-RNTI indicate the terminal equipment to transmit uplink channels or signals, such as a PUSCH, a PUCCH, a PRACH, or an SRS, etc., in these time units;

for some time units, such as slots, or symbols, or multiple symbols in a slot, etc., if the terminal equipment receives more than one DCI format 2_0 to indicate or reconfigure slot structures in these time units, it may determine slot format indications of these time units according only to one DCI format 2_0 therein; for example, the slot format indications of these time units may be determined according to DCI format 2_0 detected at some predefined or configured CORESETs, or the slot format indications of these time units may be determined according to first detected DCI format 2_0 signaling, or the slot format indications of these time units may be determined according to DCI signaling transmitted by a serving cell, or a serving TRP, or a cell therein; for example, in configuring CORESETs or search spaces, the CORESETs or search spaces of the serving cell or the serving TRP or the cell therein, and the CORESETs or search spaces of other cells, are configured separately, and association of the CORESETs or search spaces with cells is known to the terminal equipment;

for some time units, such as slots, or symbols, or multiple symbols in a slot, etc., if the terminal equipment receives more than one DCI format 2_0, it may ignore the received DCI format 2_0 signaling, rather, it determines the slot format indicators of these time units based on slot format indicators configured by higher-layer signaling.

Furthermore, the network device may perform slot format indication by using multi-stage DCI. For example, the slot format indicator is placed in DCI signaling of a stage therein, the DCI signaling being a result of negotiation by multiple TRPs, and reference may be made to the process of indicating BWPs by using multi-stage DCI for a particular process of implementation.

The above-mentioned higher-layer signaling may be a higher-layer parameter, UL-DL-configuration-common, or UL-DL-configuration-common-Set2, or UL-DL-configuration-dedicated, etc.

With the method of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

Embodiment 3

This embodiment provides a configuration apparatus for a bandwidth part indicator, configured in a network device. As principles of the apparatus for solving problems are similar to that of the method in Embodiment 1, reference may be made to the implementation of the method in Embodiment 1 for implementation of this apparatus, with identical contents being not going to be described herein any further.

Figure 6:
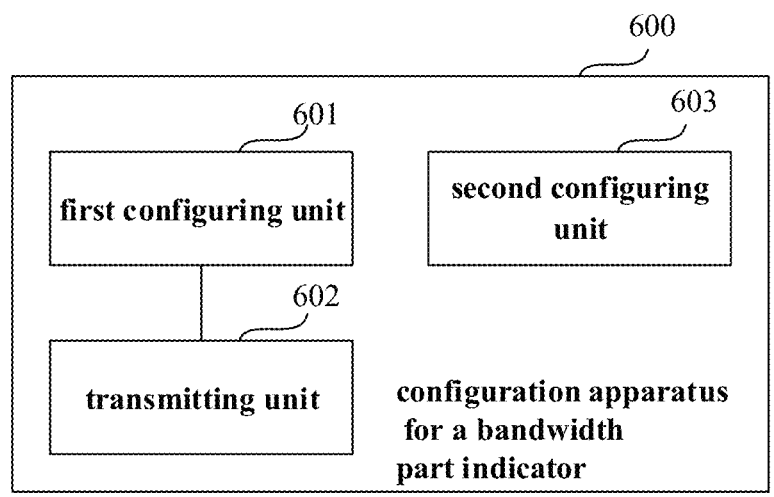
FIG. 6 is a schematic diagram of the configuration apparatus for a bandwidth part indicator of Embodiment 3.

FIG. 6 is a schematic diagram of the configuration apparatus for a bandwidth part indicator of this embodiment. Referring to FIG. 6, a configuration apparatus 600 for a bandwidth part indicator includes: a first configuring unit 601 and a transmitting unit 602.

The first configuring unit 601 configures a multi-TRP or multi-panel operation-related mode for a terminal equipment, and the transmitting unit 602 transmits configuration information and/or downlink control information to the terminal equipment, for the terminal equipment to determine an active bandwidth part according to received configuration information and/or according to detected multiple pieces of downlink control information.

In this embodiment, as shown in FIG. 6, a configuration apparatus 600 for a bandwidth part indicator may further include:

a second configuring unit 603 configured to configure the terminal equipment with maximum allowable number of downlink control channels or downlink control information used for scheduling downlink data channels, the maximum number may be configured respectively for each BWP.

In this embodiment, the above first configuring unit 601 may transmit first configuration information to the terminal equipment, the first configuration information being used to configure the multi-TRP or multi-panel operation-related mode for the terminal equipment. The first configuration information may be configured respectively for each BWP.

In one implementation, the transmitting unit 602 may transmit second configuration information to the terminal equipment, the second configuration information being used for configuring the terminal equipment with the number of BWPs, the number of BWPs being not greater than 1.

In one implementation, the transmitting unit 602 may transmit third configuration information to the terminal equipment, the third configuration information being used for configuring the terminal equipment with BWPs, a maximum number of active BWPs for each carrier being greater than 1, or a maximum number of active BWPs for each carrier being different from the number of active BWPs for each carrier when the network device configures the terminal equipment with other modes. And furthermore, as described above, the third configuration information may possibly not exist, but is provided in a protocol.

In one implementation, the transmitting unit 602 may transmit first downlink control information to the terminal equipment, the first downlink control information containing no BWP indicator field, or a bit width of a BWP indicator field contained in the first downlink control information being equal to 0.

In one implementation, the transmitting unit 602 may transmit second downlink control information to the terminal equipment, the second downlink control information containing BWP indicator fields, the number of pieces of the second downlink control information transmitted in the same scheduling unit being not greater than 1, or the number of pieces of the second downlink control information transmitted in the same scheduling unit being greater than 1, and BWPs indicated by BWP indicator fields in multiple pieces of the second downlink control information transmitted in the same scheduling unit being identical.

In one implementation, the transmitting unit 602 may transmit third downlink control information to the terminal equipment, the third downlink control information being multi-stage downlink control information, downlink control information of one stage in the multi-stage downlink control information at least containing BWP indicator fields, and downlink control information of other stages in the multi-stage downlink control information containing scheduling information of each TRP or each panel.

In one implementation, the transmitting unit 602 may transmit fourth downlink control information to the terminal equipment, the fourth downlink control information containing BWP indicator fields, the number of pieces of the fourth downlink control information transmitted in the same scheduling unit being greater than 1, and BWPs indicated by BWP indicator fields contained in the fourth downlink control information transmitted at the same scheduling unit being different, and the terminal equipment determines the active BWP according to a BWP indicated by BWP indicator field contained in one piece of the fourth downlink control information.

In this embodiment, each BWP may correspond to one or more numerology configurations. In one implementation, numerology configuration to which each BWP corresponds is terminal equipment-specific configuration, but not cell-specific configuration.

In one implementation, numerology configuration to which each BWP corresponds is terminal equipment-specific configuration and is also cell-specific configuration.

In one implementation, each numerology configuration contains a control resource set (CORESET) and/or search space configuration in current numerology.

In one implementation, in control resource sets (CORESETs) and/or search space configurations of each bandwidth part, each control resource set (CORESET) and/or search space configuration corresponds to a respective numerology configuration.

In one implementation, each numerology configuration corresponds to a downlink data channel-related parameter.

With the apparatus of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

Embodiment 4

This embodiment provides a configuration apparatus for a bandwidth part indicator, configured in a terminal equipment. As principles of the apparatus for solving problems are similar to that of the method in Embodiment 2, reference may be made to the implementation of the method in Embodiment 2 for implementation of this apparatus, with identical contents being not going to be described herein any further.

Figure 7:
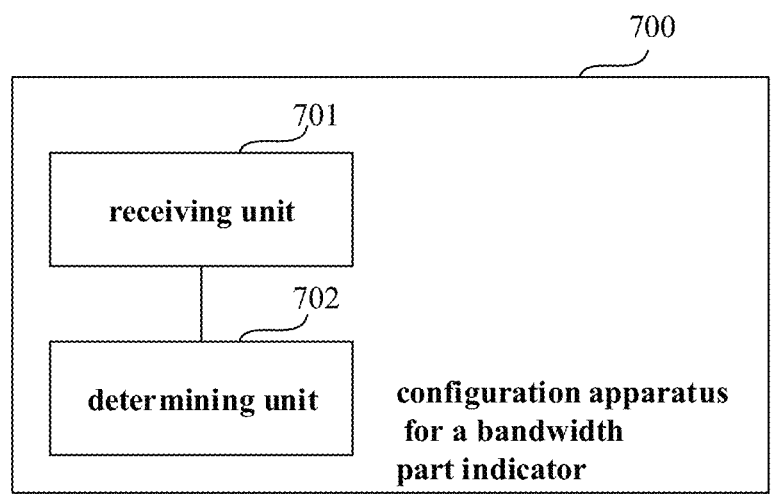
FIG. 7 is a schematic diagram of the configuration apparatus for a bandwidth part indicator of Embodiment 4.

FIG. 7 is a schematic diagram of the configuration apparatus for a bandwidth part indicator of this embodiment. Referring to FIG. 7, a configuration apparatus 700 for a bandwidth part indicator includes:

a receiving unit 701 configured to receive first configuration information, the first configuration information being used for configuring a multi-TRP or multi-panel operation-related mode for the terminal equipment; and a determining unit 702 configured to, when the terminal equipment is configured with the multi-TRP or multi-panel operation-related mode, determine an active BWP according to received configuration information and/or according to detected multiple pieces of downlink control information.

In one implementation, the first configuration information may be respectively configured for each BWP.

In one implementation, the receiving unit 701 may further receive second configuration information, the second configuration information being used for configuring the terminal equipment with the number of BWPs, the number of BWPs being 1. And in such a case, the determining unit 702 does not expect that the number of the configured BWPs is greater than 1.

In one implementation, the receiving unit 701 may further receive third configuration information, the third configuration information being used for configuring the terminal equipment with BWPs, a maximum number of active BWPs for each carrier being greater than 1, or a maximum number of active BWPs for each carrier being different from the number of active BWPs for each carrier when the terminal equipment is configured with other modes. In addition, the third configuration information may possibly not exist, but may be provided in a protocol.

In one implementation, the receiving unit 701 may further detect first downlink control information, the first downlink control information containing no BWP indicator field, or a bit width of a BWP indicator field contained in the first downlink control information being equal to 0 bit. And in such a case, the determining unit 702 does not expect that the detected first downlink control information is configured with a BWP indicator field, or the determining unit 702 does not expect that a bit width of a BWP indicator field contained in the detected first downlink control information is greater than 0 bit, or the determining unit 702 ignores a BWP indicator field in the first downlink control information.

In one implementation, the receiving unit 701 may further detect second downlink control information, the second downlink control information containing a BWP indicator field, the number of pieces of the second downlink control information detected in the same scheduling unit being not greater than 1; and in such a case, the determining unit 702 does not expect that more than one piece of the second downlink control information is detected in the same scheduling unit; or in a case where the number of pieces of the second downlink control information detected in the same scheduling unit is greater than 1, the determining unit 702 expects that BWPs indicated by BWP indicator fields in multiple pieces of the second downlink control information detected in the same scheduling unit are identical; or in a case where the number of pieces of the second downlink control information detected in the same scheduling unit is greater than 1, the determining unit 702 does not expect that BWPs indicated by BWP indicator fields in multiple pieces of the second downlink control information detected in the same scheduling unit are different.

In one implementation, the receiving unit 701 may further detect third downlink control information, the third downlink control information being multi-stage downlink control information, downlink control information of one stage in the multi-stage downlink control information at least containing a BWP indicator field, and downlink control information of other stages in the multi-stage downlink control information containing scheduling information of each TRP or each panel.

In one implementation, the receiving unit 701 may further detect fourth downlink control information, the fourth downlink control information containing a BWP indicator field, the number of pieces of the fourth downlink control information detected in the same scheduling unit being greater than 1, and BWPs indicated by bandwidth part indicator fields contained in the fourth downlink control information detected in the same scheduling unit being different. And in such a case, the determining unit 702 may determine the active BWP according to a BWP indicated by BWP indicator field contained in one piece of the fourth downlink control information, or the determining unit 702 may ignore the BWP indicator field contained in the fourth downlink control information.

With the apparatus of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

Embodiment 5

This embodiment provides a network device, including the apparatus as described in Embodiment 3.

Figure 8:
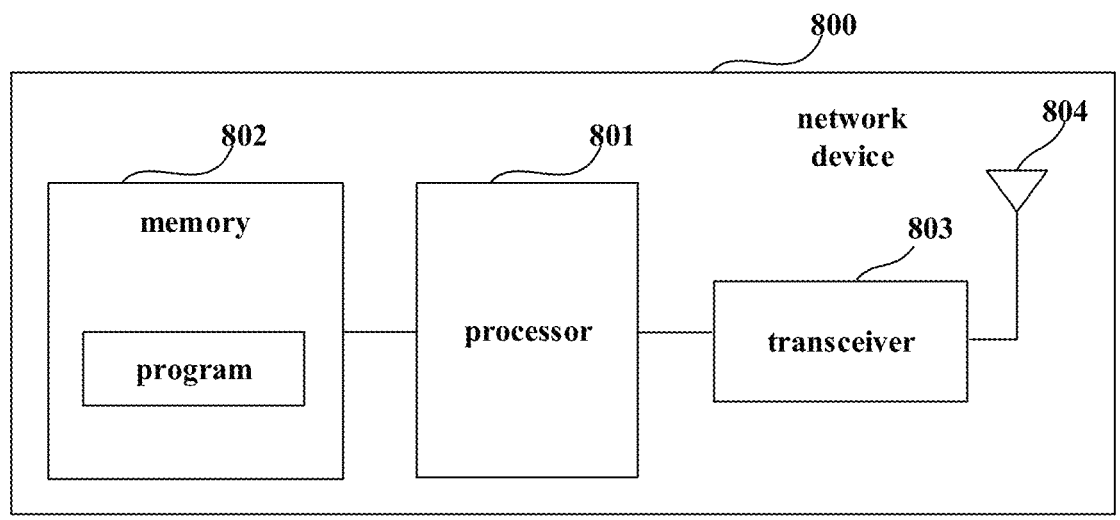
FIG. 8 is a schematic diagram of the network device of Embodiment 5.

FIG. 8 is a schematic diagram of a structure of an implementation of the network device of the embodiment of this disclosure. As shown in FIG. 8, a network device 800 may include a central processor (CPU) 801 and a memory 802, the memory 802 being coupled to the central processor 801. The memory 802 may store various data, and furthermore, it may store a program for information processing, and execute the program under control of the central processor 801, so as to receive various information transmitted by a terminal equipment and transmit various information to the terminal equipment.

In one implementation, the functions of the apparatus described in Embodiment 3 may be integrated into the central processor 801, and the central processor 801 executes the functions of the apparatus described in Embodiment 3. The functions of the apparatus described in Embodiment 3 are incorporated herein, and shall not be described herein any further.

In another implementation, the apparatus described in Embodiment 3 and the central processor 801 may be configured separately; for example, the apparatus described in Embodiment 3 may be configured as a chip connected to the central processor 801, and the functions of the apparatus described in Embodiment 3 are executed under control of the central processor 801.

Furthermore, as shown in FIG. 8, the network device 800 may include a transceiver 803, and an antenna 804, etc. Functions of the above components are similar to those in the related art, and shall not be described herein any further. It should be noted that the network device 800 does not necessarily include all the parts shown in FIG. 8. Furthermore, the network device 800 may include parts not shown in FIG. 8, and the related art may be referred to.

With the network device of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

Embodiment 6

The embodiment of this disclosure provides a terminal equipment, including the apparatus described in Embodiment 4.

Figure 9:
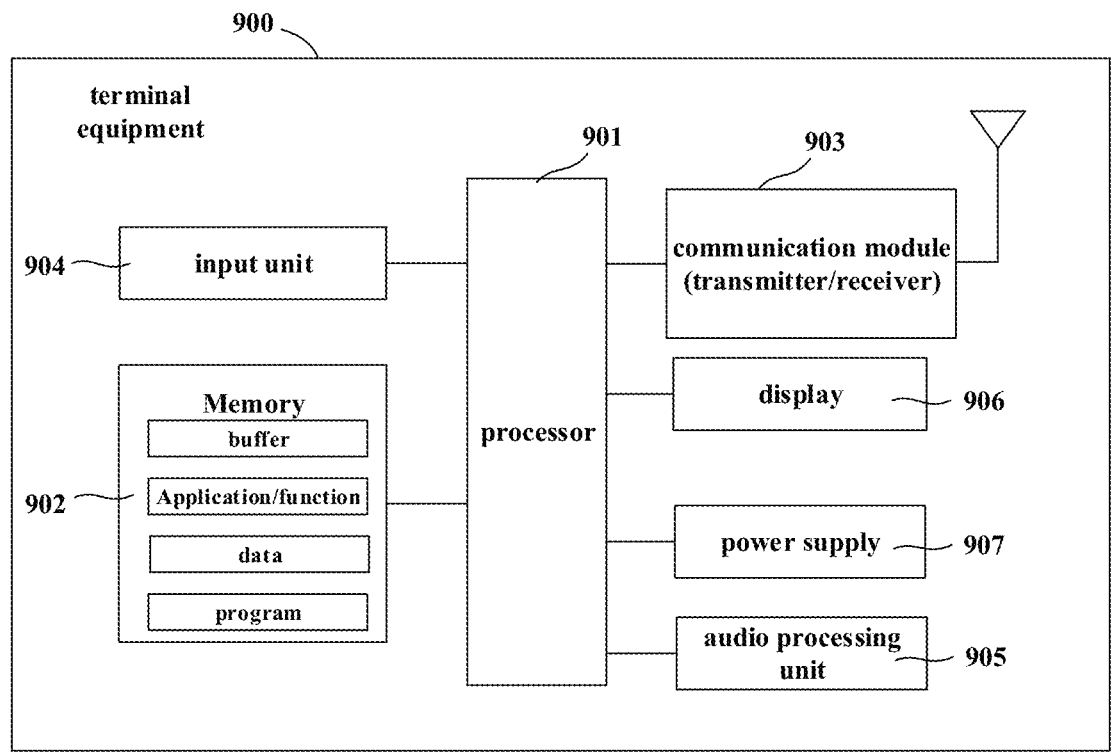
FIG. 9 is a schematic diagram of the terminal equipment of Embodiment 6.

FIG. 9 is a schematic diagram of the terminal equipment of this embodiment. As shown in FIG. 9, a terminal equipment 900 may include a central processor 901 and a memory 902, the memory 902 being coupled to the central processor 901. It should be noted that his figure is illustrative only, and other types of structures may also be used, so as to supplement or replace this structure and achieve a telecommunications function or other functions.

In one implementation, the functions of the apparatus described in Embodiment 4 may be integrated into the central processor 901, and the central processor 901 executes the functions of the apparatus described in Embodiment 4. The functions of the apparatus described in Embodiment 4 are incorporated herein, and shall not be described herein any further.

In another implementation, the apparatus described in Embodiment 4 and the central processor 901 may be configured separately; for example, the apparatus described in Embodiment 4 may be configured as a chip connected to the central processor 901, and the functions of the apparatus described in Embodiment 4 are executed under control of the central processor 901.

As shown in FIG. 9, the terminal equipment 900 may further include a communication module 903, an input unit 904, an audio processing unit 905, a display 906, and a power supply 907. It should be noted that the terminal equipment 900 does not necessarily include all the parts shown in FIG. 9. Furthermore, the terminal equipment 900 may include parts not shown in FIG. 9, and the related art may be referred to.

As shown in FIG. 9, the central processor 901 is sometimes referred to as a controller or control, which may include a microprocessor or other processor devices and/or logic devices, and the central processor 901 receives input and controls operations of every component of the terminal equipment 900.

The memory 902 may be, for example, one or more of a buffer memory, a flash memory, a hard drive, a mobile medium, a volatile memory, a nonvolatile memory, or other suitable devices, which may store the configuration information, etc., and furthermore, store programs executing related information. And the central processor 901 may execute programs stored in the memory 902, so as to realize information storage or processing, etc. Functions of other parts are similar to those of the related art, which shall not be described herein any further. The parts of the terminal equipment 900 may be realized by specific hardware, firmware, software, or any combination thereof, without departing from the scope of this disclosure.

With the terminal equipment of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

Embodiment 7

The embodiment of this disclosure provides a communication system, including a network device and a terminal equipment, the network device being the network device 800 described in Embodiment 5, and the terminal equipment being the terminal equipment 900 described in Embodiment 6.

In this embodiment, the network device may be, for example, a gNB in NR, and includes conventional compositions and functions of a network device in addition to the functions of the apparatus described in Embodiment 3, which are as described in Embodiment 5, and shall not be described herein any further.

In this embodiment, the terminal equipment is, for example, a UE served by a gNB, and includes conventional compositions and functions of a terminal equipment in addition to the functions of the apparatus described in Embodiment 4, which are as described in Embodiment 6, and shall not be described herein any further.

With the communication system of this embodiment, in the case where the terminal equipment is configured to be in a multi-TRP or multi-panel operation-related mode, which BWP is taken as an active BWP by the terminal equipment is explicitly or implicitly indicated by the network device via configuration information or DCI, and the terminal equipment may determine the active BWP according to the received configuration information and/or the DCI, thereby solving the technical problem that the terminal equipment is unable to determine which BWP is switched to in the next time unit due to BWPs indicated by multiple pieces of DCI being different.

An embodiment of the present disclosure provides a computer readable program, which, when executed in a network device, will cause a computer to carry out the method as described in Embodiment 1 in the network device.

An embodiment of the present disclosure provides a computer storage medium, including a computer readable program, which will cause a computer to carry out the method as described in Embodiment 1 in a network device.

An embodiment of the present disclosure provides a computer readable program, which, when executed in a terminal equipment, will cause a computer to carry out the method as described in Embodiment 2 in the terminal equipment.

An embodiment of the present disclosure provides a computer storage medium, including a computer readable program, which will cause a computer to carry out the method as described in Embodiment 2 in a terminal equipment.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The service reception or transmission method or measurement method carried out in the service reception or transmission apparatus or measurement apparatus described with reference to the embodiments of this disclosure may be directly embodied as hardware, software modules executed by a processor, or a combination thereof. For example, one or more functional block diagrams and/or one or more combinations of the functional block diagrams shown in the drawing may either correspond to software modules of procedures of a computer program, or correspond to hardware modules. Such software modules may respectively correspond to the steps shown in the drawing. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawing may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawing may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A configuration apparatus for a bandwidth part indicator, configured in a network device, the apparatus comprising:
   a processor configured to configure a terminal equipment to receive multiple physical downlink control channels; and
   a transmitter configured to transmit second downlink control information having a BWP (bandwidth part) indicator field indicating an active BWP, to the terminal equipment, wherein one piece of second downlink control information is carried in one of the multiple physical downlink control channels,
   wherein, a number of pieces of second downlink control information transmitted in a same scheduling unit being greater than 1, and bandwidth parts indicated by bandwidth part indicator fields in multiple pieces of the second downlink control information transmitted in the same scheduling unit being identical.

2. The apparatus according to claim 1, wherein
   the processor is further configured to configure the terminal equipment with maximum allowable number of downlink control channels or downlink control information used for scheduling downlink data channels;
   wherein the maximum number is configured respectively for each bandwidth part.

3. The apparatus according to claim 1, wherein, the transmitter transmits second configuration information to the terminal equipment, the second configuration information being used for configuring the terminal equipment with the number of bandwidth parts, the number of bandwidth parts being not greater than 1.

4. The apparatus according to claim 1, wherein, the transmitter transmits third configuration information to the terminal equipment, the third configuration information being used for configuring the terminal equipment with bandwidth parts, a maximum number of active bandwidth parts for each carrier being greater than 1, or a maximum number of active bandwidth parts for each carrier being different from the number of active bandwidth parts for each carrier when the network device configures the terminal equipment with other modes.

5. The apparatus according to claim 1, wherein each bandwidth part corresponds to one or more numerology configurations, the numerology configurations comprising a subcarrier spacing configuration and a cyclic prefix configuration.

6. The apparatus according to claim 5, wherein,
   numerology configuration to which each bandwidth part corresponds is terminal equipment-specific configuration, but not cell-specific configuration; or
   numerology configuration to which each bandwidth part corresponds is terminal equipment-specific configuration and cell-specific configuration.

7. The apparatus according to claim 5, wherein each numerology configuration contains a control resource set (CORESET) and/or search space configuration in current numerology.

8. The apparatus according to claim 5, wherein in control resource sets (CORESETs) and/or search space configurations of each bandwidth part, each control resource set (CORESET) and/or search space configuration corresponds to a respective numerology configuration.

9. The apparatus according to claim 5, wherein each numerology configuration corresponds to a downlink data channel-related parameter.

10. A configuration apparatus for a bandwidth part indicator, configured in a terminal equipment, the apparatus comprising:
    a receiver configured to receive first configuration information, the first configuration information being used for configuring the terminal equipment to receive multiple physical downlink control channels; and
    a processor configured to, when the terminal equipment is configured with receiving multiple physical downlink control channels, determine an active bandwidth part according to a detected BWP (bandwidth part indicator field of second downlink control information, wherein one piece of second downlink control information is carried in one of the multiple physical downlink control channels,
    wherein, a number of pieces of second downlink control information detected in a same scheduling unit being greater than 1, and the terminal equipment expecting that bandwidth parts indicated by bandwidth part indicator fields in multiple pieces of the second downlink control information detected in the same scheduling unit are identical.

11. The apparatus according to claim 10, wherein, the receiver is further configured to receive second configuration information, the second configuration information being used for configuring the terminal equipment with the number of bandwidth parts, the number of bandwidth parts being 1, or the terminal equipment not expecting that the number of the configured bandwidth parts is greater than 1.

12. The apparatus according to claim 10, wherein, the receiver is further configured to receive third configuration information, the third configuration information being used for configuring the terminal equipment with bandwidth parts, a maximum number of active bandwidth parts for each carrier being greater than 1, or a maximum number of active bandwidth parts for each carrier being different from the number of active bandwidth parts for each carrier when the terminal equipment is configured with other modes.

* * * * *